(12) United States Patent
Chou

(10) Patent No.: US 8,262,295 B2
(45) Date of Patent: Sep. 11, 2012

(54) PLUGGABLE OPTICAL TRANSCEIVER MODULE SET

(75) Inventor: Huitsuo Chou, Hsinchu County (TW)

(73) Assignee: Ming-Feng Ho, Hsinchu County (TW)

( * ) Notice: Subject to any disclaimer, the term of this patent is extended or adjusted under 35 U.S.C. 154(b) by 435 days.

(21) Appl. No.: 12/478,770

(22) Filed: Jun. 5, 2009

(65) Prior Publication Data
US 2010/0209112 A1    Aug. 19, 2010

(30) Foreign Application Priority Data
Feb. 19, 2009   (TW) ............................. 98202419 U

(51) Int. Cl.
*G02B 6/36*    (2006.01)
(52) U.S. Cl. ................. 385/88; 385/92; 385/94
(58) Field of Classification Search ............. None
See application file for complete search history.

(56) References Cited

U.S. PATENT DOCUMENTS

| 6,830,385 B2 * | 12/2004 | Ishigami et al. ............. 385/92 |
| 7,114,984 B2 * | 10/2006 | Shirk et al. .................. 439/372 |
| 2003/0044129 A1 * | 3/2003 | Ahrens et al. .............. 385/92 |

* cited by examiner

*Primary Examiner* — Uyen Chau N Le
*Assistant Examiner* — Chad Smith
(74) *Attorney, Agent, or Firm* — CKC & Partners Co., Ltd.

(57) ABSTRACT

A pluggable optical transceiver module set includes an optical signal male connector with an elastic flake with an opening thereon, and an optical signal female connector with a bump, a holding rod and a driven element. When the optical signal male connector is plugged into the optical signal female connector, the bump is fastened in the opening, and the optical signal male connector is disconnected from the optical signal female connector when the holding rod is moved to rotate the driven element to press the elastic flake and release the bump from the opening.

13 Claims, 13 Drawing Sheets

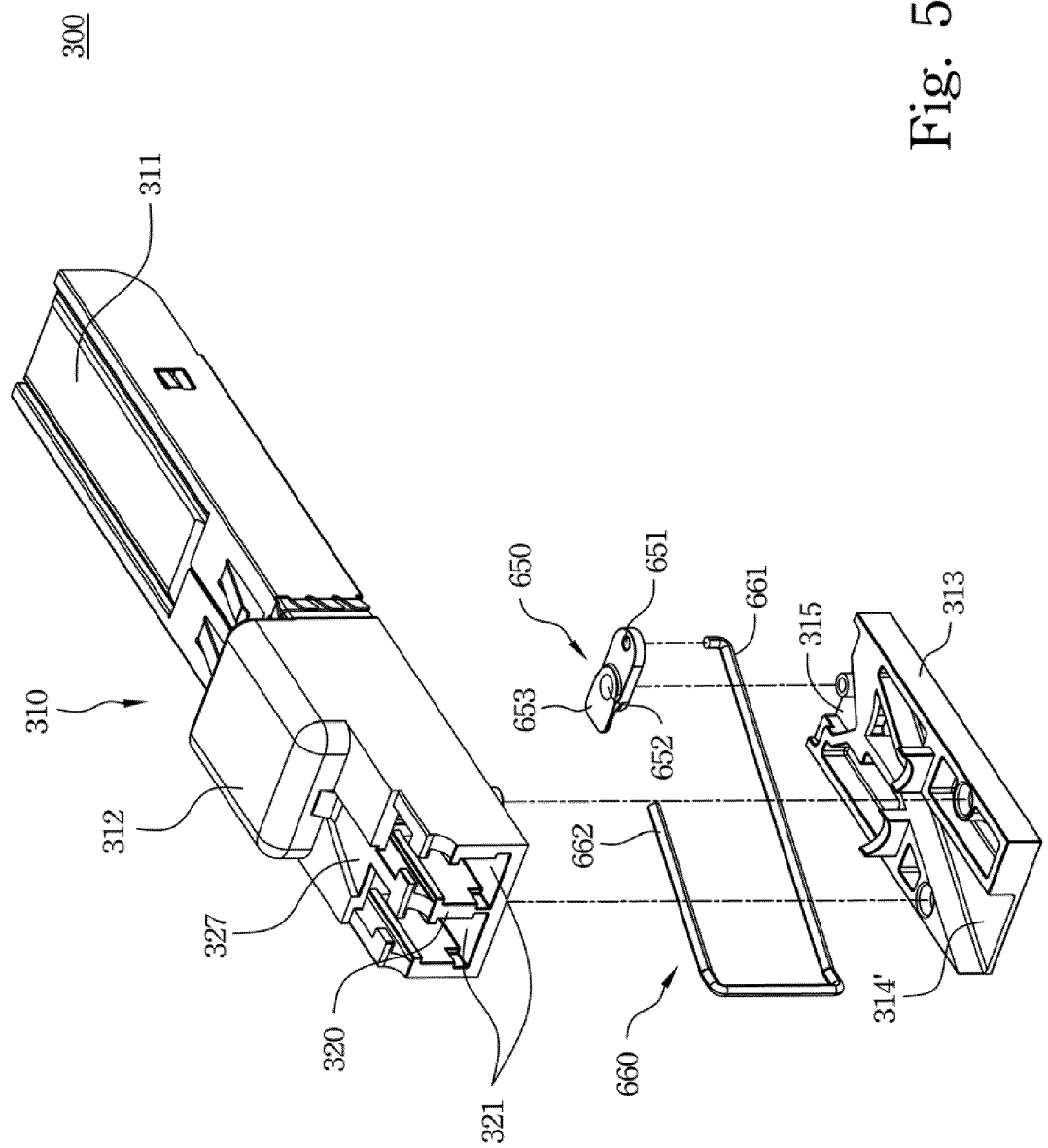

PLUGGABLE OPTICAL TRANSCEIVER MODULE SET

RELATED APPLICATIONS

This application claims priority to Taiwan Application Serial Number 98202419, filed Feb. 19, 2009, which is herein incorporated by reference

BACKGROUND

1. Field of Invention

The present invention relates to a pluggable optical transceiver module set, more particularly to a pluggable optical transceiver module set with a disconnection mechanism thereof.

2. Description of Related Art

"Fiber-Optic Communication Technology" provides a high bandwidth, low volume, high accuracy of signal communication, long distance of signal transmission, and low possibility of interference from electromagnetic wave, and the "Fiber-Optic Communication Technology" is implemented on an optical transceiver set comprising an optical cable having a first connector for transmitting optical signals, and an optical transceiver having a second connector for receiving optical signals, in which the first connector is fit the second connector, and can be plugged and fixed to the second connector.

So far, industries and designers related to fields of the "Fiber-Optic Communication Technology" are trying to improve the efficiency and convenience of connecting and disconnecting the first connector to and from the second connector.

SUMMARY

It is therefore an aspect of the present invention to provide a disconnection mechanism of a pluggable optical transceiver module set for users to effectively disconnect an optical signal male connector from an optical signal female connector in convenience and quickness.

Accordingly, the invention provides a pluggable optical transceiver module set including an optical signal male connector and an optical signal female connector. The optical signal female connector is set on an equipment, and equips an elastic flake with an opening thereon. The optical signal male connector can be plugged in to the optical signal female connector, and has a main body, a holding rod and a driven element. The main body has a bump at a first end thereof, and is connected an optical cable set at a second end in reverse to the first end thereof. The holding rod has a first end thereof in the main body, and a second end thereof extends outwardly from the second end of the main body. The driven element is in the main body in which a first end thereof is adjacent to the first end of the holding rod, a second end thereof extends to the first end of the main body, and a middle part between the first end and the second end thereof is pivotally disposed on the main body.

Therefore, when the first end of the main body is plugged into the optical signal female connector, the bump is wedged and fastened in the opening, and the second end of the driven element is adjacent to the elastic flake, and when the holding rod is moved to rotate the driven element to press the elastic flake by the second end of the driven element, the bump is released and free from the opening.

Furthermore, in a practical embodiment of the invention, the main body further has an optical signal processor at the first end thereof, and two connection ports at the second end thereof. The optical signal processor processes optical signal exchanges with the optical signal female connector when the first end of the main body is plugged into the optical signal female connector. The connection ports respectively connect an optical cable of the optical cable set; and are partitioned by a partition wall between the connection ports.

According to a first variation of the embodiment, the driven element is substantially shaped as a bar, and has a first inclined face, a second inclined face and a first pivot portion. The first inclined face is on the first end of the driven element. The second inclined face is on the second end of the driven element, and extends outwardly from the first end of the main body. The first pivot portion is is on the middle part of the driven element for pivoting on the main body. Thus, when the first end of the main body is plugged into the optical signal female connector, the second inclined face contacts against an inner surface of the elastic flake in order to disconnect the optical signal male connector from the optical signal female connector.

The holding rod in this first variation is shaped as a bar, and has a second pivot portion, a third inclined face and a hook. The second pivot portion between the first end and the second end of the holding rod is pivoted on the second end of the main body and corresponds to the partition wall. The third inclined face is on the first end of the holding rod, and is adjacent to the first inclined face of the driven element. The hook is on the second end of the holding rod.

Therefore, when the first end of the main body is plugged into the optical signal female connector, the holding rod can be rotated along the second pivot portion in a second direction, and the hook secured on a fillister of the partition wall until the holding rod is rotated to touch the partition wall.

In contrast, when an user would like to disconnect the optical signal male connector from the optical signal female connector, the user can rotate the holding rod along the second pivot portion in a first direction in reverse to the second direction, then the third inclined face of the holding rod will push the first inclined face of the driven element, and the driven element is rotated to let its second inclined face press the elastic flake. Therefore, the bump can be released from the opening, and the optical signal male connector is then disconnected from the optical signal female connector.

According to a second variation of the embodiment, a U-shaped holding rod is provided in this second variation, and the first end of the U-shaped holding rod is under the connection ports, and the second end of the U-shaped holding rod is shown outwards the main body, and is movably disposed on a limited area of the second end of the main body above the connection ports. Also, in a preferred option, the first end of the U-shaped holding rod is longer than the second end of the U-shaped holding rod for pushing or pulling the U-shaped holding rod.

The driven element in this second variation is shaped as a board, and has a third pivot portion, a fourth pivot portion and a pressing part. The third pivot portion is on the first end of the driven element, and pivotally connected to the first end of the holding rod. The fourth pivot portion is between the first end and the second end of the driven element, and pivotally disposed in an opening space of the first end of the main body. The pressing part is on the second of the driven element.

Therefore, when the first end of the main body is plugged into the optical signal female connector, the U-shaped holding rod can be pushed towards the optical signal female connector, the first end of the holding rod will push the driven element to rotate along the fourth pivot portion in a third direction. Thus, the pressing part can be rotated and hidden in the opening space, and the U-shaped holding rod can rest on the second end of the main body.

In contrast, when the user would like to disconnect the optical signal male connector from the optical signal female connector, the user can pull the U-shaped holding rod in the opposite direction to the optical signal female connector, then, the first end of the U-shaped holding rod will push the driven element to rotate along the fourth pivot portion in a fourth direction in reverse to the third direction, and the driven element will rotate to let its pressing part extends outwards the first end of the main body from the opening space. Until the first end of the U-shaped holding rod, the first end and the second end of the driven element are aligned in line, the pressing part presses the elastic flake. Therefore, the bump can be released from the opening, and the optical signal male connector is then disconnected from the optical signal female connector.

Finally, from the variations disclosed above, the present invention not only provides users to effectively disconnect the optical signal male connector and the optical signal female connector in convenience and quickness, but also provides another mode of disconnection mechanism in pluggable optical transceiver module set.

It is to be understood that both the foregoing general description and the following detailed description are examples, and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

FIG. 5 is a top view of an exploded optical signal male connector of the pluggable optical transceiver module set in a second variation of the present invention.

DESCRIPTION OF THE PREFERRED EMBODIMENTS

Figure 1:
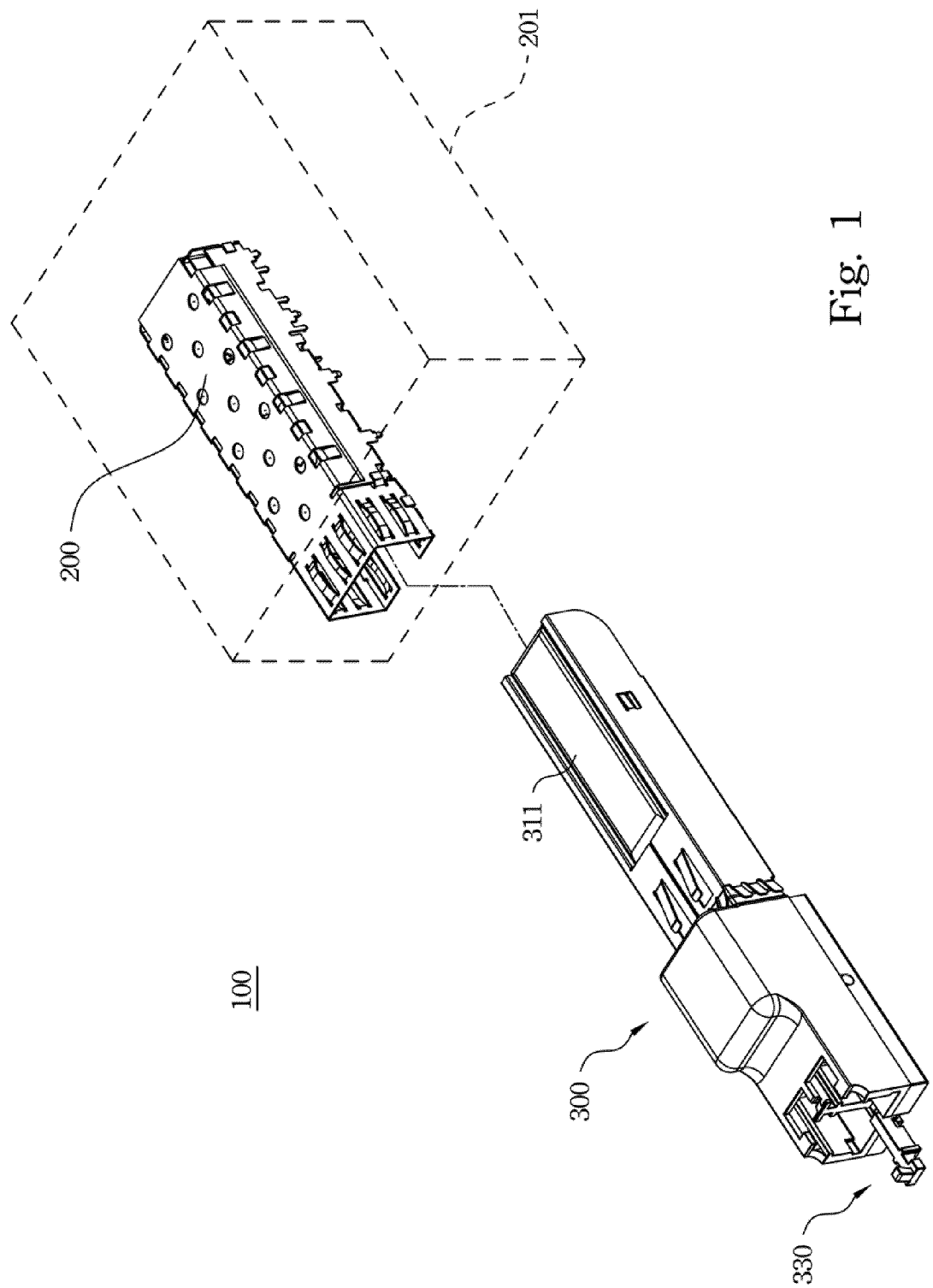
FIG. 1 is a perspective view of a pluggable optical transceiver module set in a first variation of the present invention.

Reference will now be made in detail to the present preferred embodiments of the invention, examples of which are illustrated in the accompanying drawings. Wherever possible, the same reference numbers are used in the drawings and the description to refer to the same or like parts.

The invention discloses a pluggable optical transceiver module set, also called a "small form-factor pluggable transceiver module set", including an optical signal male connector and an optical signal female connector, in which the optical signal male connector is allowable to pluggably connect/detachably disconnect from the optical signal female connector. The pluggable optical transceiver module set features a disconnection mechanism design with some elements which are respectively arranged on the optical signal male connector and the optical signal female connector in order to move a holder to drive a pivoted element rotating and then to disconnect the male connector from the female connector quickly and smoothly.

Figure 2:
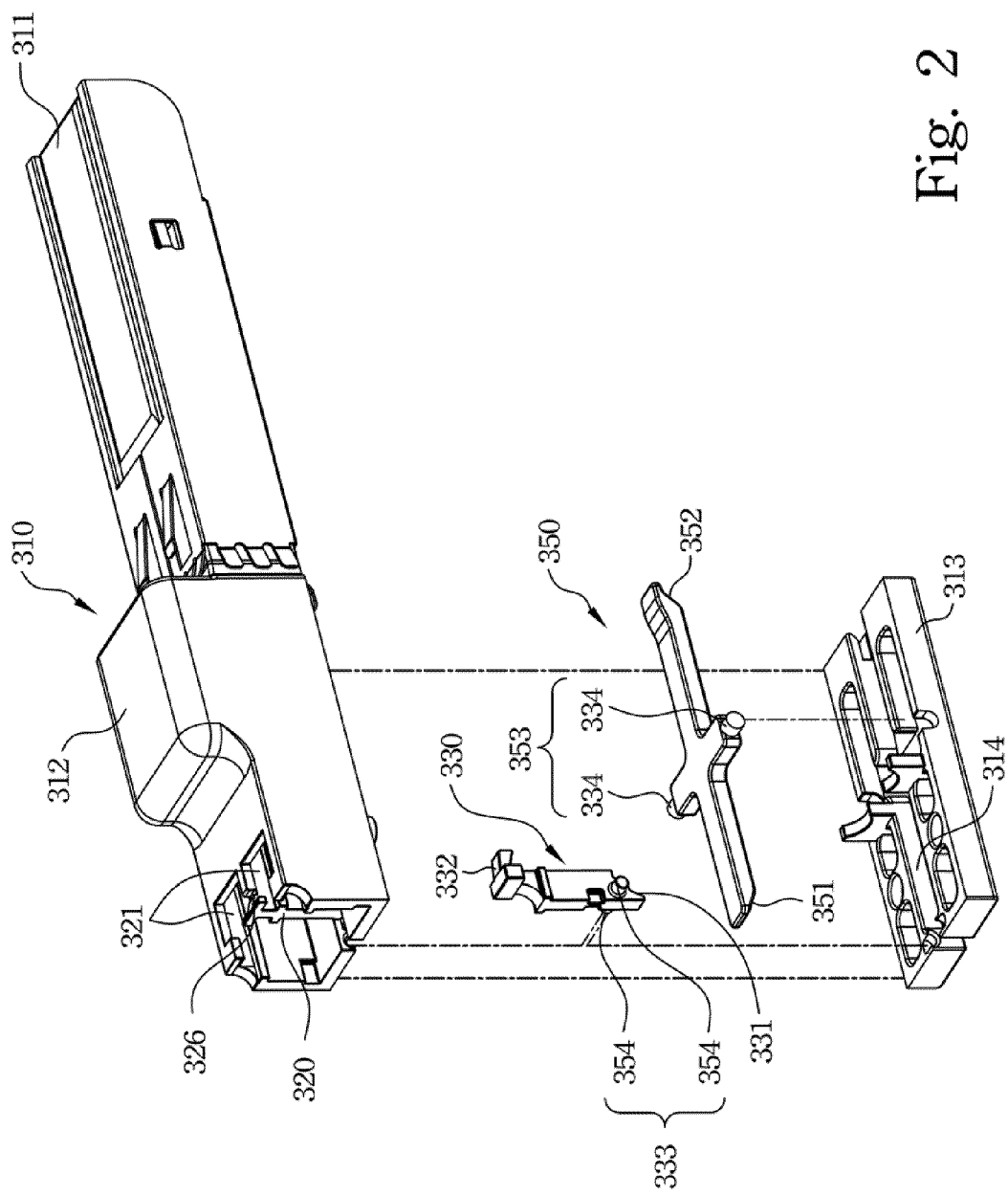
FIG. 2 is a top view of an exploded optical signal male connector of the pluggable optical transceiver module set in FIG. 1.
Figure 3:
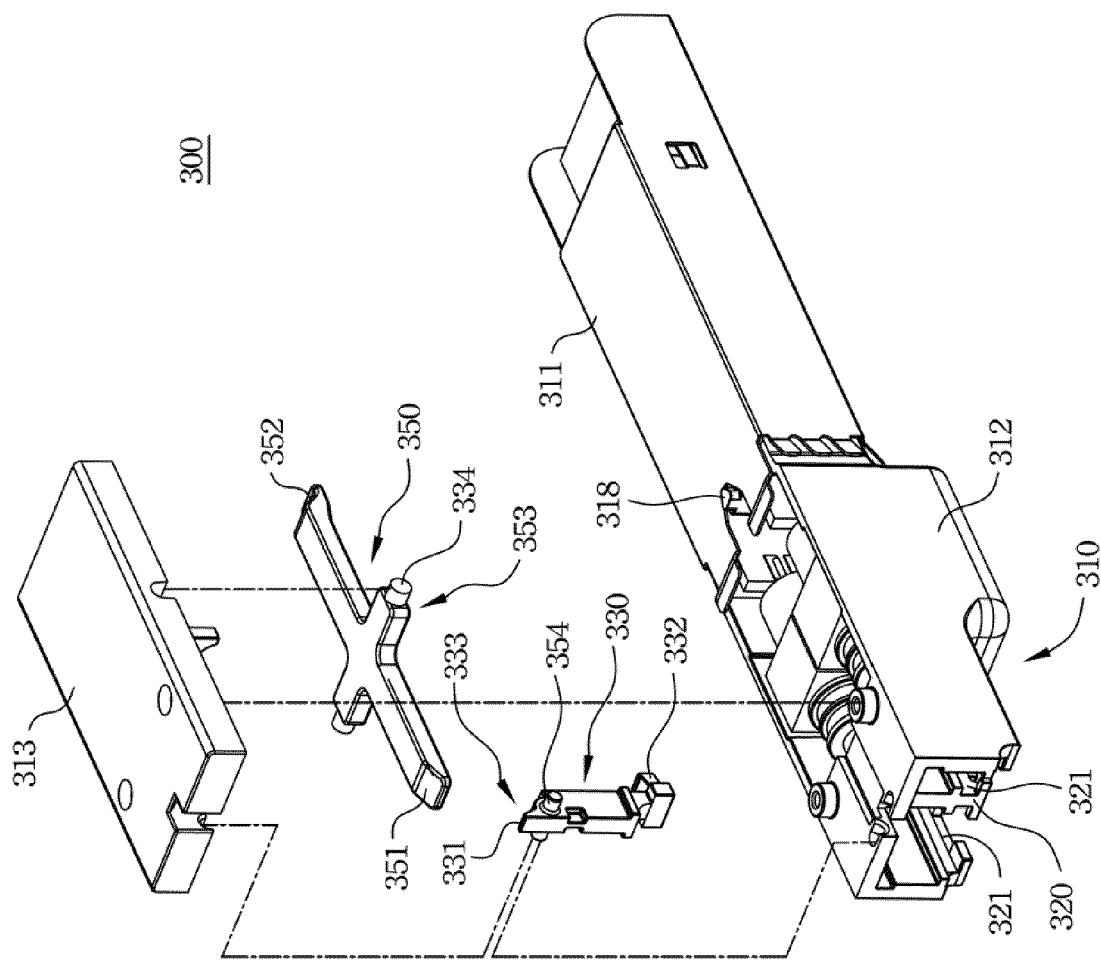
FIG. 3 is a bottom view of an exploded an optical signal male connector of the pluggable optical transceiver module set in FIG. 1.

Refer to FIG. 1, FIG. 2 and FIG. 3. FIG. 1 is a perspective view of a pluggable optical transceiver module set in a first variation of the present invention. FIG. 2 and FIG. 3 are top and bottom views of an exploded optical signal male connector of the pluggable optical transceiver module set in FIG. 1.

In an embodiment of the pluggable optical transceiver module set 100, the optical signal female connector 200, which is seen as an optical signal transmitting/receiving interface of any kind of equipment 201 and arranged on a side of the equipment 201, can be plugged in to the optical signal male connector 300 as an optical signal transmitting/receiving interface of an optical cable set (not shown).

Figure 4A:
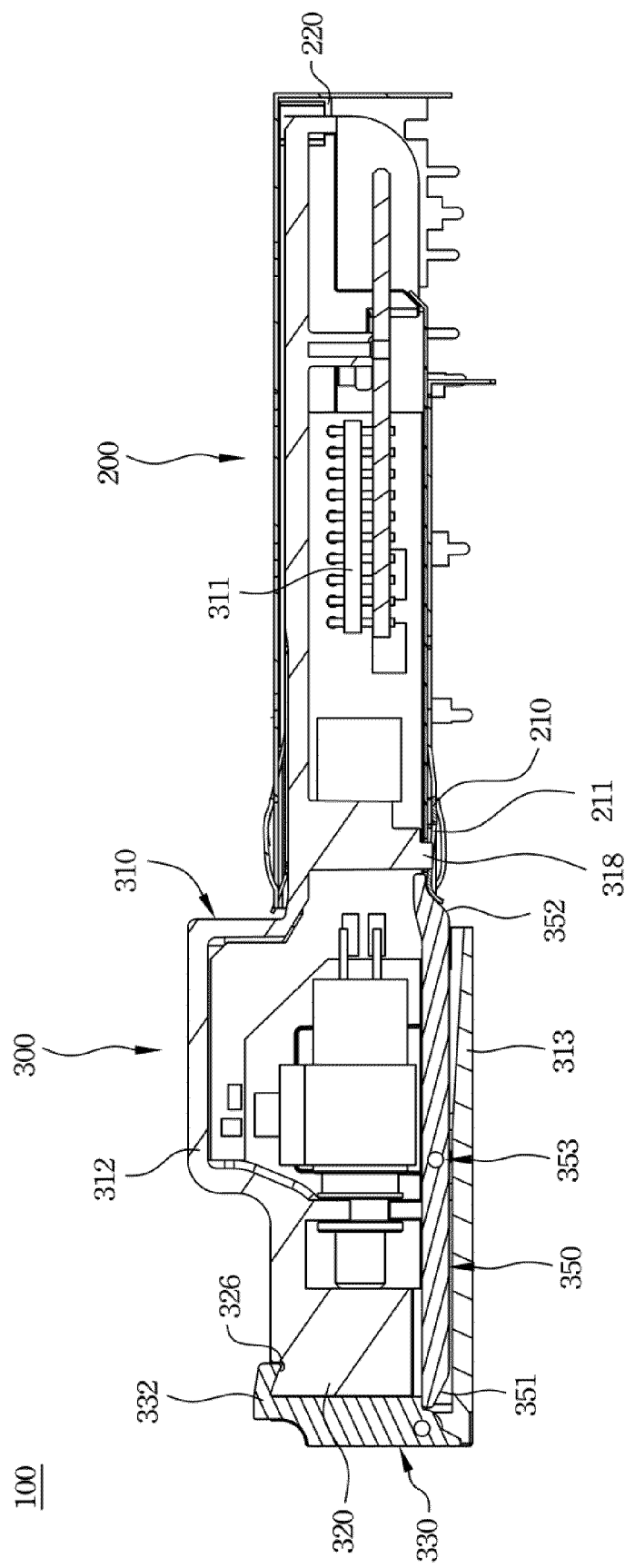
FIG. 4A is a cross-sectional view of the pluggable optical transceiver module set in the first variation of the present invention while being operated through a first move.

The optical signal female connector 200 has an elastic flake 210 and a resilient member 220 (see FIG. 4A). The elastic flake 210 is on a port edge of the optical signal female connector 200, and has an opening 211 thereon (see FIG. 4A). The resilient member 220 is arranged in the optical signal female connector 200 and able to lean against the optical signal male connector 300 when the optical signal male connector 300 is plugged into the optical signal female connector 200.

Figure 4B:
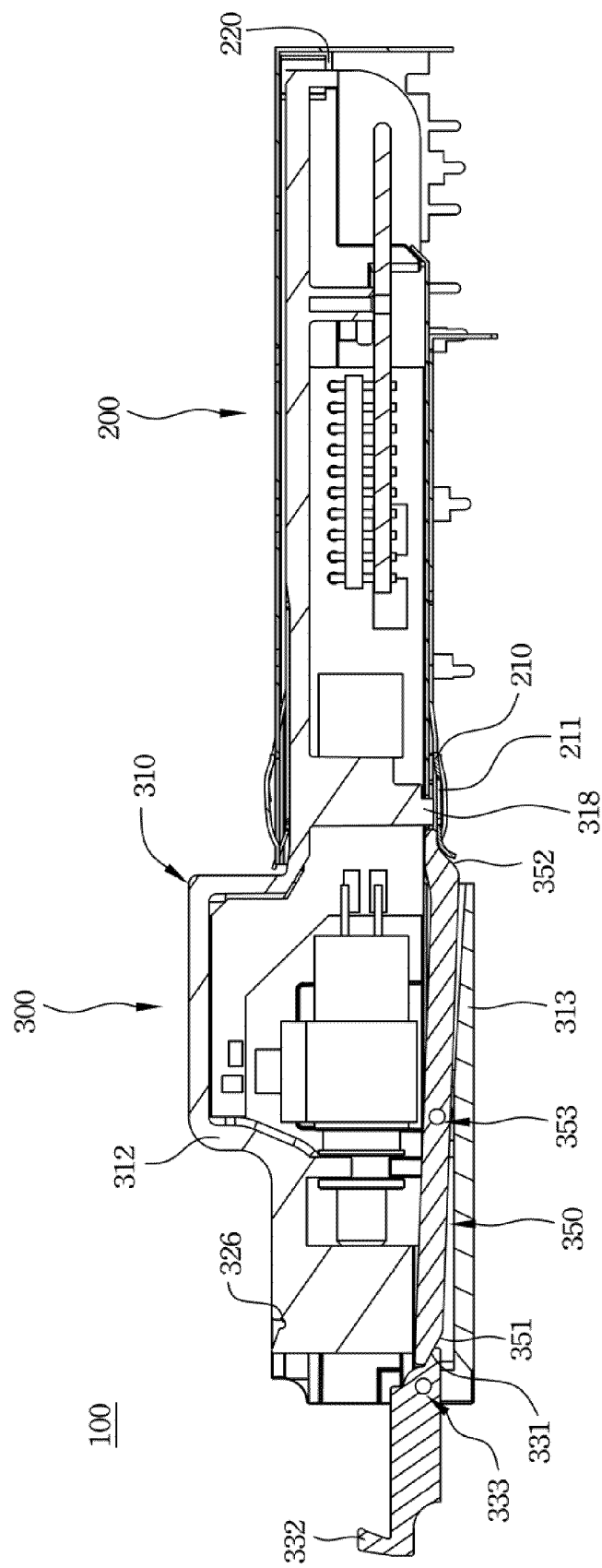
FIG. 4B is a cross-sectional view of the pluggable optical transceiver module set in the first variation of the present invention while being operated through a second move.
Figure 4C:
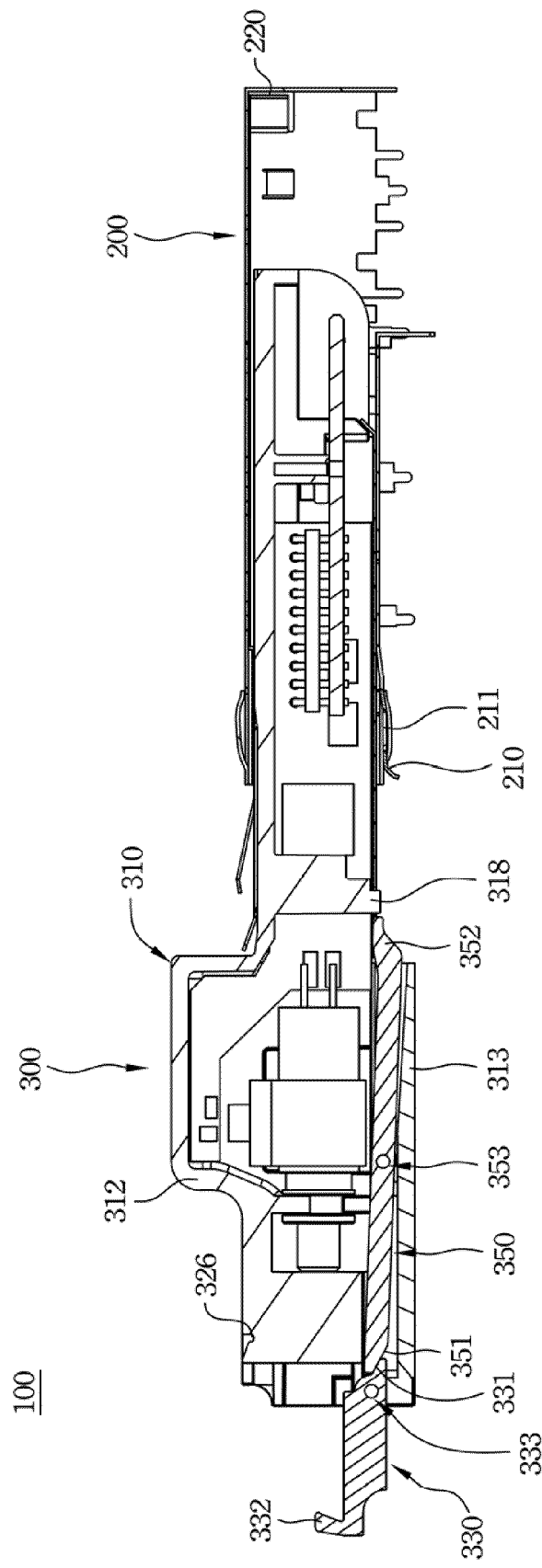
FIG. 4C is a cross-sectional view of the pluggable optical transceiver module set in the first variation of the present invention while being operated through a third move.

The optical signal male connector 300 includes a main body 310, a holding rod 330 and a driven element 350. The main body 310 can be recognized as a main part of the optical signal male connector 300 including a housing 312, an external case 313, an optical processor 311 and other elements in respect to optical signal transmitting/receiving functions (as shown in FIG. 4A-FIG. 4C but not described particularly here). The optical processor 311 and other elements in respect to optical signal transmitting/receiving functions are contained in the housing 312, and the external case 313 can cover one side of the housing 312 to contain the holding rod 330 and the driven element 350.

In detail, the housing 312 has a bump 318 placed somewhere on a first end of the main body 310, and two parallel connection ports 321 placed on a second end in reverse to the first end of the main body 310. The bump 318 is suit in size and shape to the opening 211 as described above and is corresponding to the opening 211. The connection ports 321 are partitioned by a partition wall 320 in between and can be respectively connected by an optical cable (not shown) of the optical cable set. Furthermore, the optical processor 311 is placed on the first end of the main body 310, and can be processed an optical signal transmitting/receiving procedure with the optical signal female connector 200.

The holding rod 330 has a first end disposed in the main body 310, and a second end thereof extends outwardly from the second end of the main body 310. The driven element 350 disposed in the main body 310 includes a first end, a second end and a middle part, in which the first end thereof is adjacent to the first end of the holding rod 330, the second end thereof extends to the first end of the main body 310, and the middle part between the first end and the second end thereof is pivotally disposed on the main body 310.

Therefore, when the first end of the main body 310 is plugged into the optical signal female connector 200, the bump 318 will be wedged and fastened in the opening 211 to secure the connection of the optical signal male connector 300 and the optical signal female connector 200. Meanwhile, the resilient member 220 is elastically compressed by the first end of the main body 310 when the first end of the main body 310 is plugged into the optical signal female connector 200.

On the other hand, when the optical signal male connector 300 is going to disconnect from the optical signal female connector 200, the holding rod 330 can be moved by the user to rotate the driven element 350 to press the elastic flake 210 by the second end of the driven element 350, thus, the bump 318 is released and free from the opening 211. Also, as soon as the bump 318 is released from the opening 211, the resilient member 220 elastically recovers and forces the first end of the main body 310 (i.e. the bump 318) away from the opening 211.

Refer to FIG. 2 and FIG. 3 again. According to a first variation of the embodiment, the driven element 350 can be substantially shaped as a bar, and contained in a holding space 314 of the external case 313. The driven element 350 has a first inclined face 351, a second inclined face 352 and a first pivot portion 353. The first inclined face 351 is arranged on the first end of the driven element 350. The second inclined face 352 is arranged on the second end of the driven element 350 partly extending outwardly from the first end of the main body 310. Thus, when the first end of the main body 310 is plugged into the optical signal female connector 200, the second inclined face 352 touches against an inner surface of the elastic flake 210.

The first pivot portion 353 is arranged on the middle part of the driven element 350, and has two opposite pivots 334 respectively set on two opposite sidewalls of the driven element 350. When the external case 313 covers to the housing 312, the driven element 350 pivots on the external case 313 with its pivots 334 and can be rotated along the first pivot portion 353 as a seesaw does within the holding space 314.

However, as long as the driven element is pivoted in the main body, the detailed structure is not only limited into the above description on FIG. 1 to FIG. 3.

The holding rod 330 can be substantially shaped as a bar, and has a second pivot portion 333, a third inclined face 331 and a hook 332. The third inclined face 331 is arranged on the first end of the holding rod 330, and is adjacent to the first inclined face 351 of the driven element 350. The hook 332 is arranged on the second end of the holding rod 330. The second pivot portion 333 is arranged between the third inclined face 331 and the hook 332, preferably near the third inclined face 331. The second pivot portion 333 has two opposite pivots 354 respectively set on two opposite sidewalls of the holding rod 330 for pivoting on the second end of the main body 310. When the external case 313 covers to the housing 312, the holding rod 330 pivots on the external case 313 with its pivots 354 and aligns to the partition wall 320 without interfering the connection of the optical cables. However, as long as the holder rod 330 is pivots on the second end of the main body 310, the detailed structure is not only limited into the above description on FIG. 1 to FIG. 3.

Refer to FIG. 4A, FIG. 4B and to FIG. 4C. FIG. 4A to FIG. 4C are cross-sectional views of the pluggable optical transceiver module set in the first variation of the present invention while being operated through some continued moves. After the first end of the main body 310 is plugged into the optical signal female connector 200, or the first end of the main body 310 is unplugged from the optical signal female connector 200, an user can rotate the holding rod 330 along the second pivot portion 333 to move the hook 332 to secure on a fillister 326 disposed upon is the partition wall 320 in a second direction (see FIG. 4A).

On the other hand, when the user is going to unplug the first end of the main body 310 away from the optical signal female connector 200, the user will rotate the holding rod 330 along the second pivot portion 333 in a second direction opposite to the first direction, and to move the third inclined face 331 to contact and push the first inclined face 351 of the driven element 350 (as shown from FIG. 4A to FIG. 4B). Consequently, the driven element 350 is rotated along the first pivot portion 353 in the second direction to press the elastic flake 210 to bend and thus to release the bump 318 from the opening 211. Thus, the first end of the main body 310 (i.e. the bump 318) can be far away from the opening 211 by the elastically recovered resilient member 220. (As shown from FIG. 4B to FIG. 4C).

It is worthy to notice that after the first end of the main body 310 is no longer secured in the optical signal female connector 200, the hook 332 can be held as a handle to pull the entire optical signal male connector 300 out of the optical signal female connector 200.

Refer to FIG. 5. FIG. 5 is a top view of an exploded optical signal male connector of the pluggable optical transceiver module set in a second variation of the present invention. According to the second variation of the embodiment, a U-shaped holding rod 660 and a driven element 650 are provided therein. A first end 661 of the U-shaped holding rod 660, preferably longer than a second end 662 thereof, can be contained in a holding space 314' of the external case 313. Thus when the external case 313 covers the housing 312, the first end 661 of the U-shaped holding rod 660 is under the connection ports 321 (as shown in FIG. 5), and the second end 622 of the U-shaped holding rod 660 is out of the holding space 314' and movably disposed upon the connection ports 321 on a limited area 327 of the second end of the main body 310 (as shown in FIG. 5).

The driven element 650 is shaped as a board, and arranged in an opening space 315 of the external case 313 near the optical signal female connector 200. The driven element 650 has a third pivot portion 651, a fourth pivot portion 652 and a pressing part 653. The third pivot portion 651 is arranged on the first end of the driven element 650, and pivotally connected to the first end 661 of the U-shaped holding rod 660. The pressing part 653 is arranged on the second of the driven element 650. The fourth pivot portion 652 is arranged between the third pivot portion 651 and the pressing part 653, and pivotally disposed on the external case 313. Thus when the external case 313 covers to the housing 312, the driven element 650 can be rotated along the fourth pivot portion 652 within the opening space 315 to either hide in the opening space 315 in a third direction or extend outwards the opening space 315 in a fourth direction in reverse to the third direction.

Figure 6A:
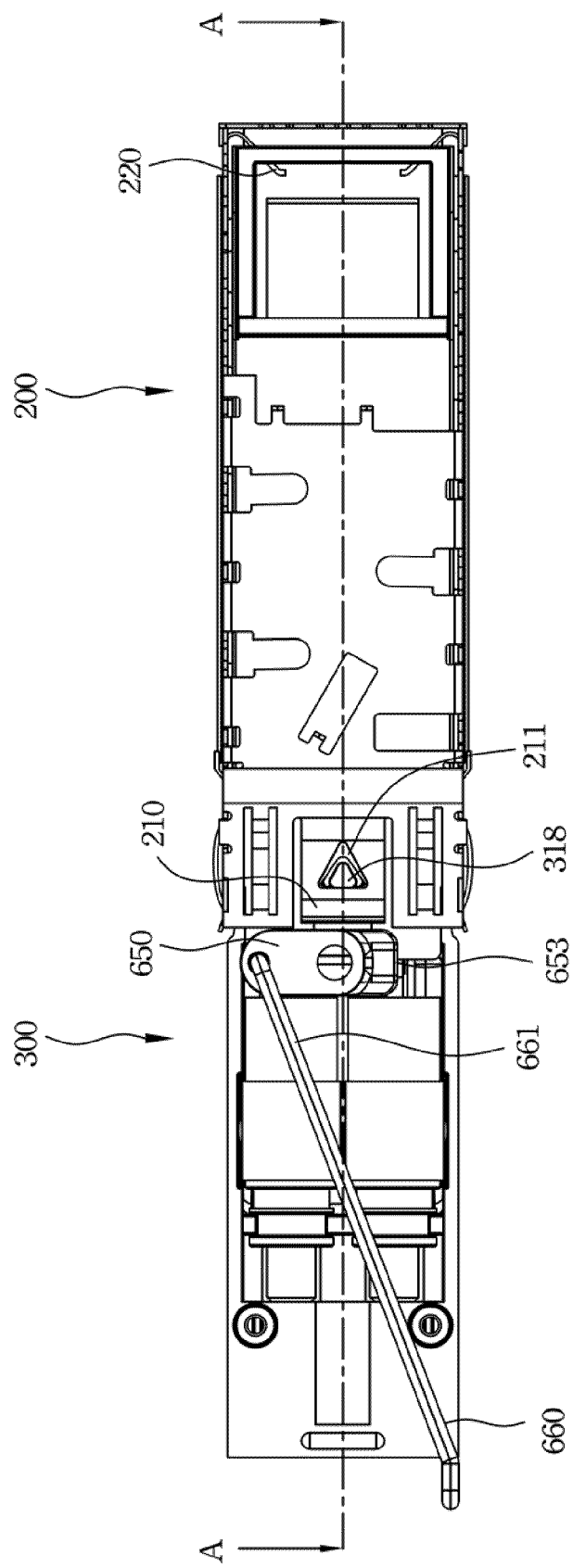
FIG. 6A is a bottom view of the pluggable optical transceiver module set in the second variation of the present invention while being operated through a first move.
Figure 6B:
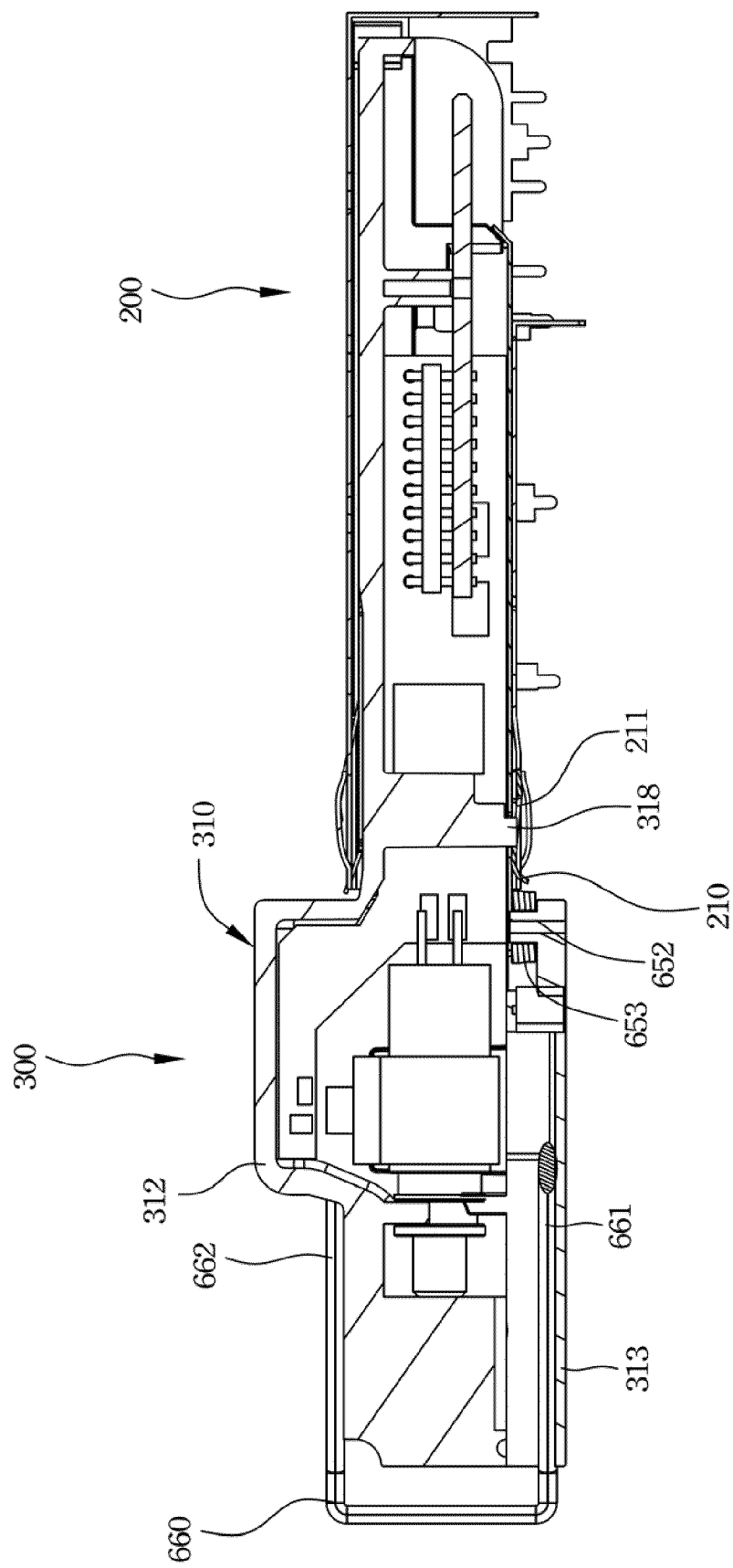
FIG. 6B is a cross-sectional view along a line A-A in FIG. 6A of the pluggable optical transceiver module set.

Refer to FIG. 6A and FIG. 6B. FIG. 6A is a bottom view of the pluggable optical transceiver module set in the second variation of the present invention while being operated through a first move. FIG. 6B is a cross-sectional view along a line A-A in FIG. 6A of the pluggable optical transceiver module set.

After the first end of the main body 310 is plugged into the optical signal female connector 200, or the first end of the main body 310 is unplugged from the optical signal female connector 200, the user can push the U-shaped holding rod 660 following a direction from the second end to the first end of the main body 310, and the third pivot portion 651 of the driven element 650 is then pushed by the first end 661 of the U-shaped holding rod 660. Consequently, the driven element 650 is rotated along the fourth pivot portion 652 in the third direction to hide in the opening space 315.

Meanwhile, the second end 662 of the U-shaped holding rod 660 rests on the limited area 327 of the second end of the main body 310, and aligns to the partition wall 320 between the optical signal cables without interfering the connection of the optical cables.

Figure 7A:
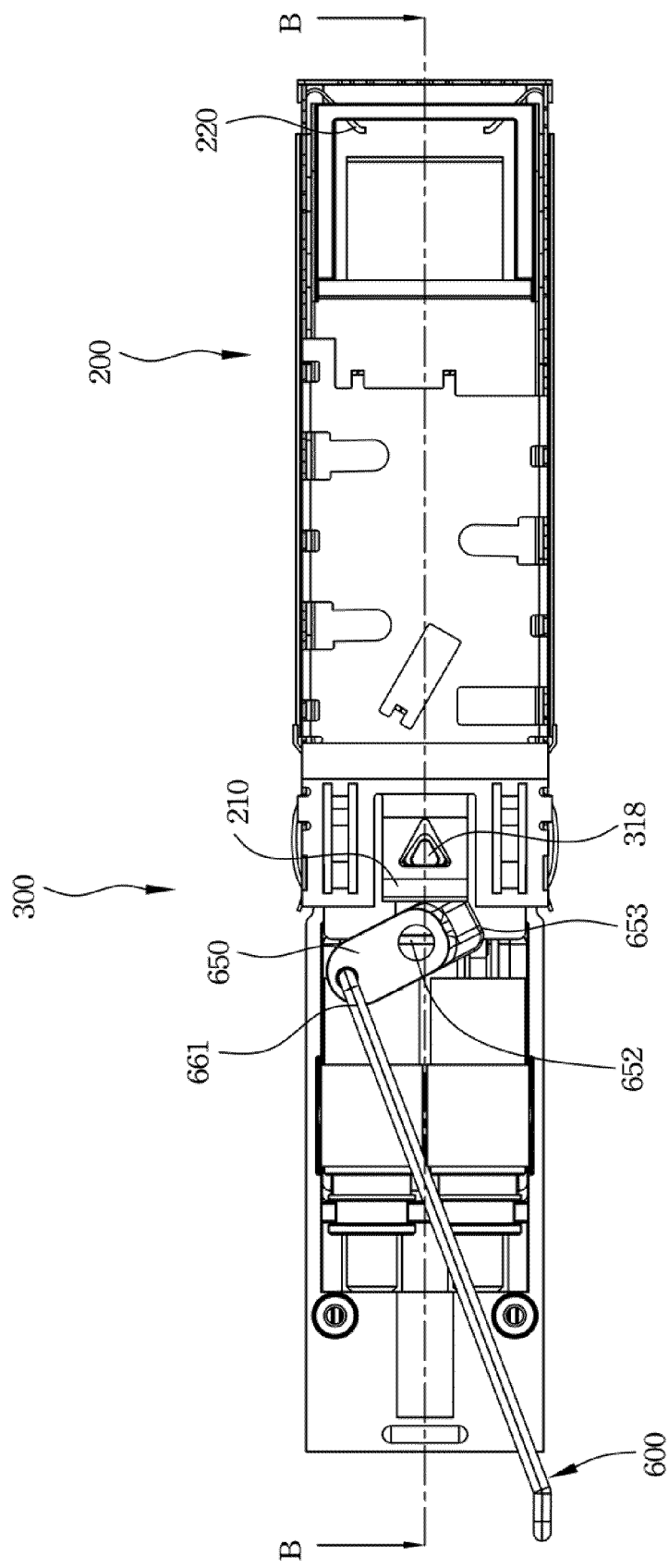
FIG. 7A is a bottom view of the pluggable optical transceiver module set in the second variation of the present invention while being operated through a second move.
Figure 7B:
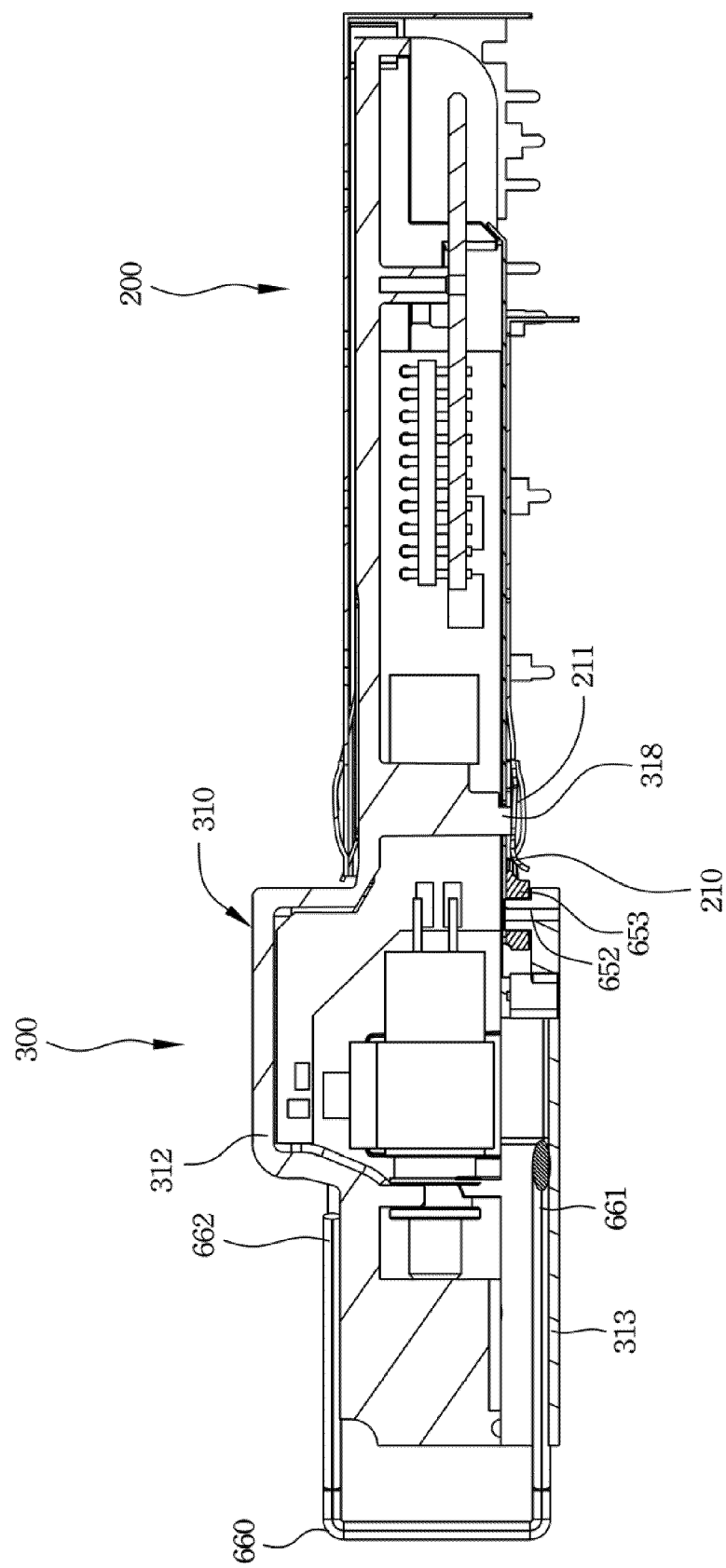
FIG. 7B is a cross-sectional view along a line B-B in FIG. 7A of the pluggable optical transceiver module set.
Figure 8A:
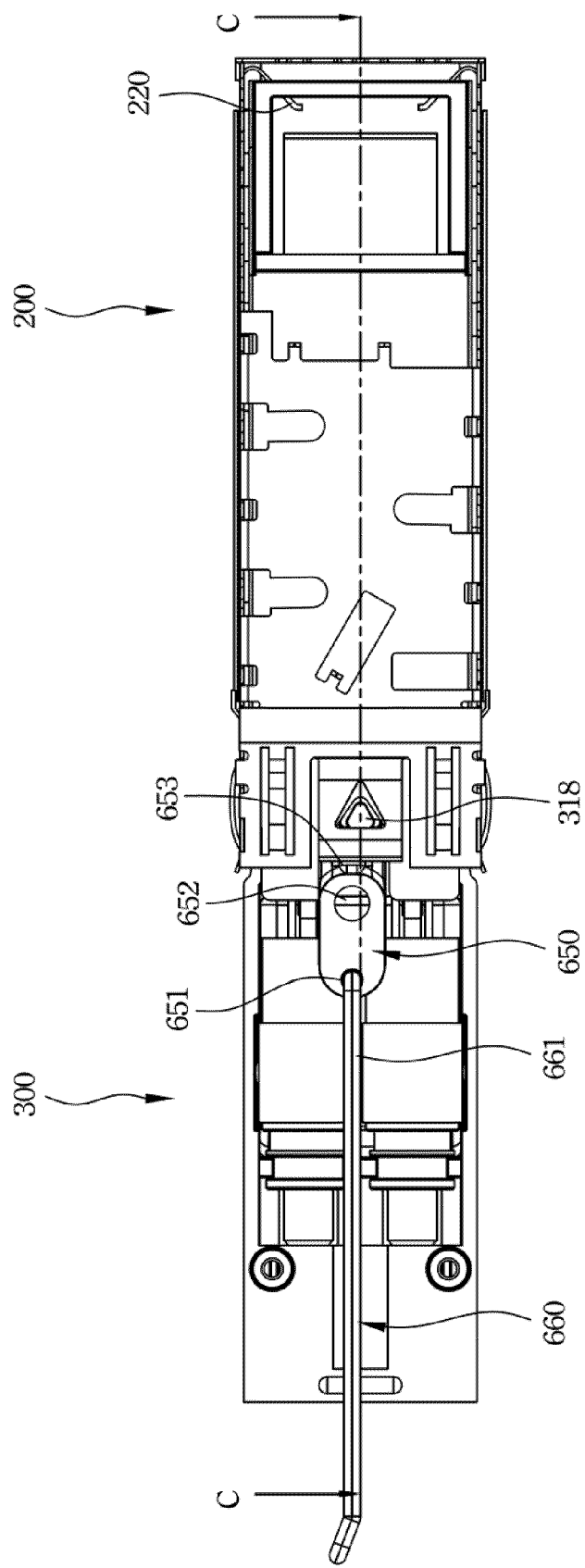
FIG. 8A is a bottom view of the pluggable optical transceiver module set in the second variation of the present invention while being operated through a third move.
Figure 8B:
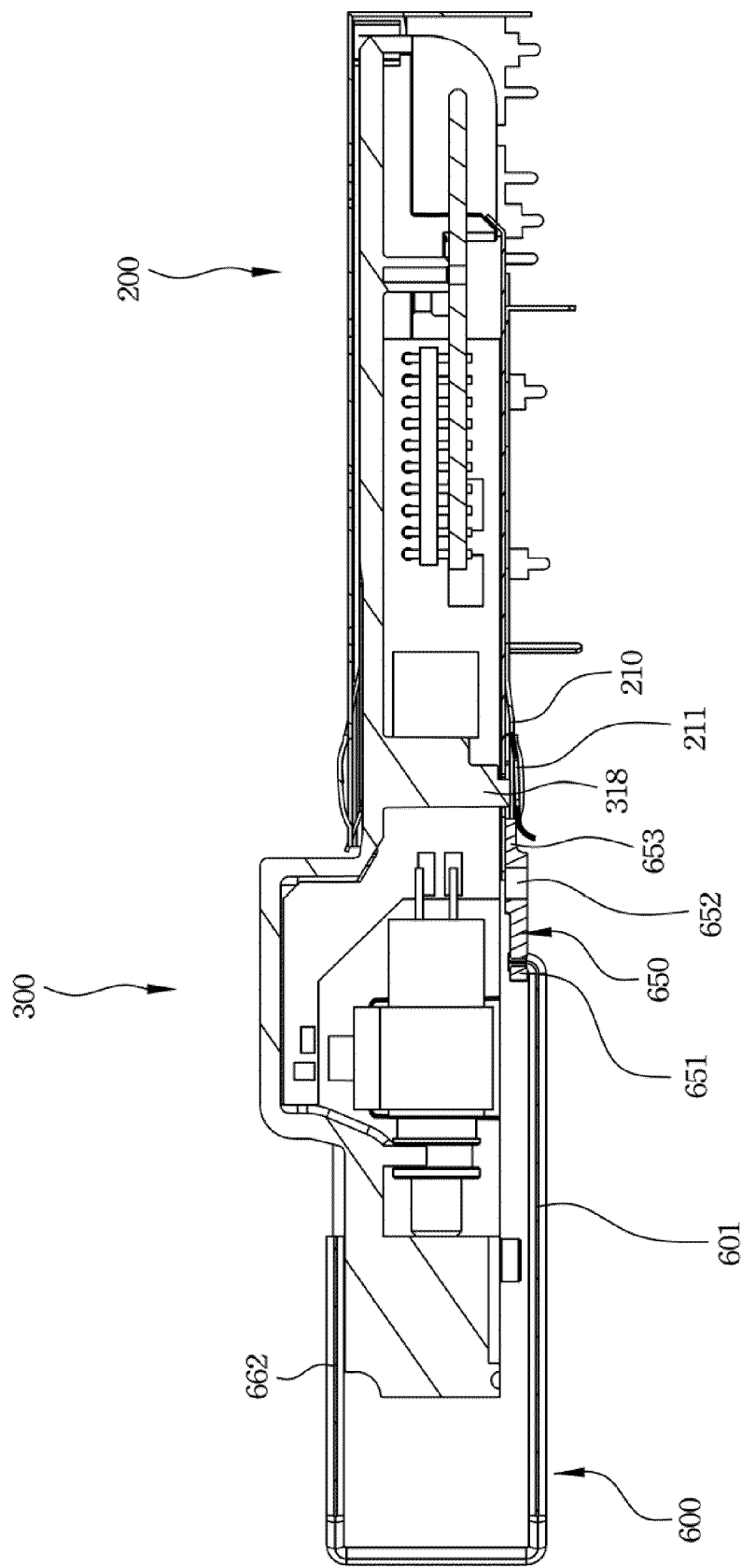
FIG. 8B is a cross-sectional view along a line C-C in FIG. 8A of the pluggable optical transceiver module set.

On other hand, refer to FIG. 7A, FIG. 7B, FIG. 8A and FIG. 8B. FIG. 7A is a bottom view of the pluggable optical transceiver module set in the second variation while being operated through a second move. FIG. 7B is a cross-sectional view along a line B-B in FIG. 7A. FIG. 8A is a bottom view of the pluggable optical transceiver module set in the second variation while being operated through a third move. FIG. 8B is a cross-sectional view along a line C-C in FIG. 8A. When the user is gong to unplug the first end of the main body 310 away from the optical signal female connector 200 (as shown in FIG. 7A and FIG. 7B), the user can pull the U-shaped holding rod 660 following a direction from the first end to the second end of the main body 310, thus, the first end 661 of the U-shaped holding rod 660 is rotated along the third pivot portion 651. The first end of the driven element 650 is then pulled to rotate along the fourth pivot portion 652 in the fourth direction. Once the first end 661 of the U-shaped holding rod 660, the first end and the second end of the driven element 650 are aligned in line (as shown in FIG. 8A and FIG. 8B), the pressing portion 653 of the driven element 650 extends outwards the opening space 315 to press the elastic flake 210, and the elastic flake 210 is bended to release the bump 318 from the opening 211. Consequently, the first end of the main body 310 (i.e. the bump thereon) can be far away from the opening 211 by the elastically recovered resilient member 220.

After the first end of the main body 310 is no longer secured in the optical signal female connector 200, the U-shaped holding rod 660 can be held as a handle to pull the entire optical signal male connector 300 out of the optical signal female connector 200.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A pluggable optical transceiver module set comprising:
an optical signal female connector having an elastic flake with an opening thereon; and
an optical signal male connector served to pluggably connect the optical signal female connector, comprising:
a main body comprising a housing and an external case, wherein the housing has a bump at a first end thereof, and served to connect an optical cable set at a second end thereof, and the external case has two opposite recesses on two opposite sides thereof, and covers on the housing;
a holding rod disposed in the main body at a first end thereof, and extending outwardly from the second end of the main body at a second end thereof; and
a driven element disposed in the main body, and having a first end thereof adjacent to the first end of the holding rod, a second end thereof extending to the first end of the housing, and a first pivot portion positioned between the first end and the second end thereof, wherein the first pivot portion has two opposite pivots respectively set on two opposite sidewalls of the driven element, each of the pivots is placed in one of the recesses to be pivotally disposed on the main body for pivoting on the main body;
wherein, when the first end of the main body is plugged into the optical signal female connector, the bump is fastened in the opening, and the second end of the driven element is adjacent to the elastic flake,
when the holding rod is moved to rotate the driven element to press the elastic flake by the second end of the driven element, the bump is released from the opening.
2. The pluggable optical transceiver module set of claim 1, wherein the main body further comprising:
two connection ports both disposed at the second end of the main body, and respectively served to connect an optical cable of the optical cable set; and
a partition wall disposed between the connection ports to partition the connection ports.
3. The pluggable optical transceiver module set of claim 2, wherein the driven element is shaped as a bar, and comprises:
a first inclined face positioned on the first end of the driven element; and
a second inclined face positioned on the second end of the driven element, and extending outwardly from the first end of the main body,
wherein, when the first end of the main body is plugged into the optical signal female connector, the second inclined face touches against an inner surface of the elastic flake.
4. The pluggable optical transceiver module set of claim 3, wherein the holding rod is shaped as a bar, and comprises:
a second pivot portion positioned between the first end and the second end of the holding rod, and pivotally disposed on the second end of the main body corresponding to the partition wall; and
a third inclined face positioned on the first end of the holding rod, and served to push the first inclined face of the driven element to rotate the second inclined face of the driven element for pressing the elastic flake when the holding rod is rotated along a first direction.
5. The pluggable optical transceiver module set of claim 4, wherein the holding rod further comprises:
a hook disposed on the second end of the holding rod, and served to secure on a fillister of the partition wall when the holding rod is rotated along a second direction in reverse to the first direction to contact the fillister.
6. The pluggable optical transceiver module set of claim 1, wherein the first end of the main body further comprises an optical signal processor.
7. The pluggable optical transceiver module set of claim 1, wherein a resilient member is set in the optical signal female connector,
wherein, when the first end of the main body is plugged into the optical signal female connector, the resilient member is elastically compressed by the first end of the main body, when the bump is released from the opening, the resilient member elastically recovers and forces the bump thereon away from the opening.

8. An optical signal male connector served to pluggably connect an optical signal female connector, comprising:
   a main body comprising a housing and an external case, wherein the housing has a bump at a first end thereof, and served to connect an optical cable set at a second end thereof, and the external case has a holding space thereon and two opposite recesses on two opposite sides thereof, and the external case is covered on the housing to hide the holding space therein;
   a holding rod disposed in the main body at a first end thereof, and extending outwardly from the second end of the main body at a second end thereof; and
   a driven element disposed in the holding space, and having:
   a first end thereof adjacent to the first end of the holding rod;
   a second end thereof extending to the first end of the housing; and
   a first pivot portion positioned between the first end and the second end thereof, wherein the first pivot portion has two opposite pivots respectively set on two opposite sidewalls of the driven element, each of the pivots is placed in one of the recesses to be pivotally disposed on the main body for pivoting on the main body;
   wherein, when the first end of the main body is plugged into the optical signal female connector, the bump is fastened in an opening of an elastic flake of the optical signal female connector, and the second end of the driven element is adjacent the elastic flake,
   when the holding rod is moved to rotate the driven element to press the elastic flake by the second end of the driven element, the bump is released from the opening.

9. The optical signal male connector of claim 8, wherein the main body further comprising:
   two connection ports both disposed at the second end of the main body, and respectively served to connect an optical cable of the optical cable set; and
   a partition wall disposed between the connection ports to partition the connection ports.

10. The optical signal male connector of claim 9, wherein the driven element is shaped as a bar, and comprises:
    a first inclined face positioned on the first end of the driven element; and
    a second inclined face positioned on the second end of the driven element, and extending outwardly from the first end of the main body,
    wherein, when the first end of the main body is plugged into the optical signal female connector, the second inclined face touches against an inner surface of the elastic flake.

11. The optical signal male connector of claim 10, wherein the holding rod comprises:
    a second pivot portion positioned between the first end and the second end of the holding rod, and pivotally disposed on the second end of the main body corresponding to the partition wall; and
    a third inclined face positioned on the first end of the holding rod, and served to push the first inclined face of the driven element to rotate the second inclined face of the driven element for pressing the elastic flake when the holding rod is rotated along a first direction.

12. The optical signal male connector of claim 11, wherein the holding rod further comprises:
    a hook disposed on the second end of the holding rod, and served to secure on a fillister of the partition wall when the holding rod is rotated along a second direction in reverse to the first direction to contact the fillister.

13. The optical signal male connector of claim 8, wherein the first end of the main body further comprises an optical signal processor.

* * * * *